US012646055B2

(12) United States Patent
Puehse et al.

(10) Patent No.: US 12,646,055 B2
(45) Date of Patent: Jun. 2, 2026

(54) CONSERVING SYSTEM RESOURCES WITH CREDENTIAL DIGITIZATION AND ENROLLMENT

(71) Applicant: MASTERCARD INTERNATIONAL INCORPORATED, Purchase, NY (US)

(72) Inventors: Tobias Puehse, Stamford, CT (US); Andras Hemberger, Long Island City, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 405 days.

(21) Appl. No.: 17/896,672

(22) Filed: Aug. 26, 2022

(65) Prior Publication Data
US 2024/0070655 A1 Feb. 29, 2024

(51) Int. Cl.
| | |
|---|---|
| *G06Q 20/38* | (2012.01) |
| *G06Q 20/20* | (2012.01) |
| *G06Q 20/34* | (2012.01) |
| *G06Q 20/40* | (2012.01) |
| *H04L 9/32* | (2006.01) |

(52) U.S. Cl.
CPC ....... *G06Q 20/38215* (2013.01); *G06Q 20/20* (2013.01); *G06Q 20/206* (2013.01); *G06Q 20/351* (2013.01); *G06Q 20/3821* (2013.01); *G06Q 20/40145* (2013.01); *H04L 9/3213* (2013.01); *G06Q 2220/00* (2013.01)

(58) Field of Classification Search
CPC ........... G06Q 20/38215; G06Q 20/206; G06Q 20/351; G06Q 20/20; G06Q 20/3821
See application file for complete search history.

(56) References Cited

U.S. PATENT DOCUMENTS

| | | | | |
|---|---|---|---|---|
| 9,519,901 | B1 * | 12/2016 | Dorogusker ..... | G06Q 20/40145 |
| 11,756,036 | B1 * | 9/2023 | Aggarwal .......... | G06V 40/1365 |
| | | | | 705/44 |
| 12,045,821 | B1 * | 7/2024 | Bhattacharyya ..... | G06Q 20/065 |
| 2007/0022048 | A1 * | 1/2007 | Kingsborough ... | G06Q 30/0236 |
| | | | | 705/40 |
| 2017/0236116 | A1 * | 8/2017 | Jordan ................. | G06Q 20/341 |
| | | | | 705/41 |
| 2018/0218367 | A1 * | 8/2018 | Mendoza ............. | G06Q 20/322 |
| 2022/0101853 | A1 * | 3/2022 | Kim ........................ | G10L 15/30 |

* cited by examiner

*Primary Examiner* — John W Hayes
*Assistant Examiner* — Taylor S Rak
(74) *Attorney, Agent, or Firm* — Barta Jones, PLLC

(57) ABSTRACT

Examples provide a system and method for digitization of payment credentials via a point-of-sale (POS) device. When a physical payment credential is presented, the system determines, in real-time, if the credential is enrolled in a digitized payment credential service. If the credential is not enrolled and the user is qualified for enrollment based on eligibility rules, the system prompts the user to consent to automatic enrollment via the POS device. If consent is obtained, the system triggers digitization of the payment credential, which is stored at the digitized payment credential service. A token corresponding to the digitized payment credential is linked to one or more identifiers of the user, such as email, phone number, shopper account number, biometric data, or other identifiers. When enrollment is complete, the user can provide linked identifier(s) at the POS to complete payment of future transaction without presenting the tokenized physical payment credential.

20 Claims, 13 Drawing Sheets

200

POS INTERFACE 204

PAYMENT
ACCOUNT DATA
112

USER-PROVIDED
DATA
206

IDENTIFIER(S)
208

PORTAL
214

ENROLLMENT SERVER 210

ENROLLMENT MANAGER 212

INQUIRY 216    PROMPT 224

TOKENIZATION 226

LINKING 234    REQUEST 236

CREDENTIAL
DATABASE
222

CoF 218

ENTRY 220

DIGITIZED PAYMENT
CREDENTIAL SERVICE
202

ACCOUNT SERVER 122

PAYMENT
CREDENTIAL
TOKEN
228

SET OF
IDENTIFIER(S)
230

ACCOUNT REFERENCE ID 232

SET OF RULES 234

400

CONSERVING SYSTEM RESOURCES WITH CREDENTIAL DIGITIZATION AND ENROLLMENT

BACKGROUND

Merchants frequently provide customers with digital customer loyalty programs via merchant applications. The applications frequently provide the customer with coupons, discounts, freebies, reward points and other benefits if the user downloads the application and manually enrolls in the program. The user then uses the application during transactions at point-of-sale devices, such as self-checkout (SCO), order kiosks, and other payment terminals. However, customer adoption of these programs can be quite low, limiting the merchants return-on-investment (ROI) for these digital marketing resources. Moreover, the multi-step process of enrolling customers frequently results in inefficient consumption of system resources.

SUMMARY

Some examples provide a system and method for credential digitization via a point-of-sale (POS) device. An enrollment manager identifies a physical payment credential presented by a user at the POS device which is not tokenized or otherwise enrolled in a digital payment credential service. The user is identified based on at least one identifier associated with the user. If the user is eligible for enrollment based on a set of eligibility rules and a threshold maximum number of prompts have not already been presented to the user during previous transactions, the enrollment engine manager presents a prompt to the user requesting consent to digitize the physical payment credential via a user interface device associated with the POS device. If consent is obtained, the physical payment credential is digitized, and a payment credential token associated with the digital payment credential is generated. The payment credential token is linked to one or more identifiers associated with the user. Upon completion of enrollment, the payment credential token is used to complete future transactions associated with the identified user without a presence of the physical payment credential at the POS device. An enrollment completion notification is output to the user indicating successful enrollment of the physical payment credential at the POS device while reducing system resource usage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
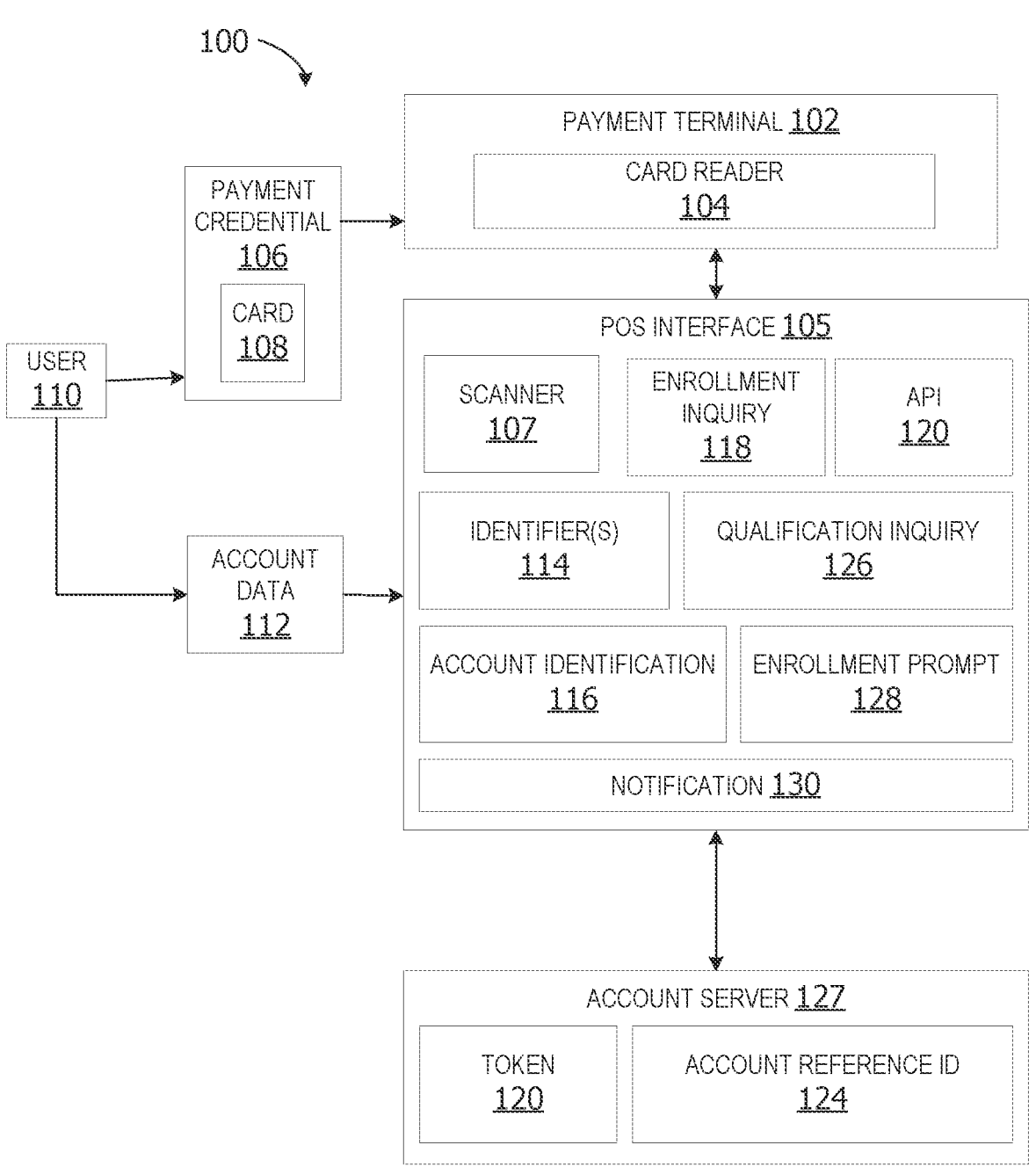
FIG. 1 is an exemplary block diagram illustrating a system for credential digitization and enrollment.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Adoption of merchant-provided digital shopper applications and user-accounts has historically been quite low, limiting ROI for merchants. Moreover, customers using these applications are frequently required to scan a loyalty shopper card or quick response (QR) code on a merchant application during a transaction at a POS device in addition to providing a physical payment credential and verifying that payment credential. This creates a multi-step customer identification, enrollment and verification process requiring the user to enroll in a digitized payment credential system using one or more user computing devices to interact with a merchant computing system, a payment credential issuer system and/or a digitized payment credential system to enroll and enable utilization of digitized payment credentials with a specific merchant, which can be frustrating and burdensome for customers, inefficiently consuming system resources, as well as reducing customer adoption of merchant provided digital reward services.

Referring to the figures, examples of the disclosure enable an enrollment manager which automatically prompts a user at a POS device to enroll a physical payment credential in a digitized payment credential service. In some examples, the enrollment manager checks a set of tokens corresponding to digitized payment credentials of one or more users (customers) to determine if a presented physical payment credential is already enrolled in a digitized payment credential service, such as a credential-on-file (CoF) directory or CoF router. If the payment credential is already enrolled, the user is not prompted to re-enroll. The system only prompts users for consent to digitize the credential if the credential has not previously been digitized. This streamlines the process for the user and avoids requesting enrollment for already enrolled credentials while creating an improved customer experience.

Aspects of the disclosure further enable a set of configurable eligibility rules which enables the enrollment manager to automatically determine if a given user and/or payment credential is qualified for enrollment based on the merchant/issuer customized rules. This permits merchants and issuers of payment credentials to customize rules used to determine whether a given payment credential should be enrolled in the digital payment credential service. In this manner, each merchant and/or issuer has flexibility for selecting users for enrollment based on the user shopping frequency, transaction amounts, locations of stores frequented by the user, target geographic areas, target specific types of payment credentials, or any other criteria for customizing the enrollment of users and/or payment credentials for improved customization meeting the diverse needs of different merchants/issuers.

The system is scalable and enables enrollment of various types of payment credentials into a click-to-pay directory service using payment terminal infrastructure to acquire and simplify digital onboarding for merchants. The system drives user preference for network credentials while simplifying digital onboarding for merchants and permitting use of universal identifiers.

In some examples, the system identifies a user automatically based on a payment credential presented by a user, such as a payment card. The system utilizes the payment credential with pre-existing customer account information available at the merchant computing system to identify the user. This reduces the number of steps required to identify and/or verify an identity of a user at the POS device thus improving system processor utilization efficiency. In other words, automatically identifying the user based on the user-provided payment credential and user account information reduces processor usage by eliminating one or more user identification and/or verification steps.

In other examples, the system presents a prompt at a merchant POS device to an identified user requesting customer consent for automatic enrollment in a digitized payment credential program. The prompt enables the user to consent to enrollment at the POS device in real-time while the user is performing a transaction at the POS device. Prompting of the user at the POS eliminates the necessity of the user enrolling via a user device after the current transaction at the POS device is concluded. Presenting the prompt reduces processor resource utilization.

In some examples, the user activates the account via the user's own computing device (user device) to reduce resources required for user enrollment. In other examples, an enrollment prompt is presented to the user at the POS device, the user device, or another user interface device, such as via an enrollment email, text message or other reminder notification triggering a user activation step for identification and shopper verification on the user's computing device. This further reduces utilization of network bandwidth otherwise required for transmission of enrollment reminders and enrollment data from the merchant system to the user computing device.

Other aspects enable creation and/or sending of an enrollment request from the POS device to the digitized payment credential service on behalf of the customer and/or merchant. The creation of the enrollment request at the POS further reduces processor resource usage and network bandwidth usage by initiating the enrollment process and/or consolidating one or more of the enrollment steps at the POS device rather than requiring the user to initiate the enrollment process at a later time using one or more other user computing devices. In some examples, although enrollment is initiated at the POS, enrollment verification may be completed via a separate user computing device for improved security.

In still other examples, the system further enables generation of a payment credential token associated with the digitized payment credential and one or more user identifiers stored at the merchant system. The stored token reduces system memory usage and data storage. Storing the token further improves security while reducing fraud by enabling storage of the token rather than storage of the actual payment credential(s).

The payment token in other examples enables completion of future transactions using the stored token in an absence of the physical payment credential for improved customer interaction via the user interface. The user is identified using an identifier without presenting the payment credential to complete payment transactions for improved transaction processing efficiency and customer convenience The POS interface device associated with a conventional merchant payment terminal operates in an unconventional manner by automatically determining if a user's physical payment card or other payment credential is already enrolled in a card on file (CoF) system. If not, the system automatically prompts the user to consent via the payment terminal enabling the system to trigger digitization of the payment credential and enrollment of the digitized payment credential in the CoF system for future utilization in completing transactions without the physical payment card (card not present). This enables more convenient transaction completion, improves customer adoption of merchant digital shopper programs, improves user efficiency via the UI interaction, and reduces the number of identification and verifications steps for customers at the check-out, thereby improving the functioning of the underlying POS/payment terminal. Moreover, the system is enabled to capture and recognize credentials at the network level without upgrading or altering merchant POS systems or payment terminals. The POS system is the primary interface to the shopper to complete the enrollment check-in service and check-out process.

Referring again to FIG. 1, an exemplary block diagram of a system 100 illustrates credential digitization and enrollment system 100. The payment terminal 102 is a device which receives a payment credential from the user 110. The payment terminal 102 optionally includes a processor and memory for executing computer-executable instructions enabling the computing device to operate as a payment terminal, such as, but not limited to, a point-of-sale (POS) device. In some examples, the payment terminal 102 is implemented as a self-checkout (SCO) POS device, a payment kiosk, or any other type of payment terminal.

The card reader 104 is a device for reading data from a physical payment credential 106, such as, but not limited to, a payment card. A payment card 108 can include a credit card, debit card, a cryptocurrency account card, a gift card, or any other type of payment card. However, the payment credential 106 is not limited to payment cards. In other examples, the payment credential 106 includes a digital wallet associated with a user device or any other type of payment credential presented by a user 110 for completion of a payment transaction at the payment terminal. The physical payment credential 106 is physically present at the payment terminal/POS device during the transaction in this example. Thus, in this example, the payment terminal is a standardized, certified device to capture payment credentials via the user swiping, dipping, or tapping the payment card 108.

A POS interface 105 device of the merchant that conducts the interaction with the shopper (user 110), such as scanning of items in the shopper's basket, recording total amount due, etc. In this example, the POS interface 105 includes a scanner 107 device for scanning a barcode, quick response (QR) code, matrix barcode, radio frequency identification (RFID) tag, or any other type of item identifier.

The POS interface 105 obtains account data 112 from the user 110. The account data 112 is a user profile or customer account associated with the user, such as, but not limited to, a frequent customer card, a loyalty rewards card, a merchant application on the user's mobile user device, or any other user account data associated with the user 110 used to identify an account or profile of the user maintained or otherwise accessible to the merchant associated with the payment terminal 102 and/or the POS interface. The account data 112 stored in the user account can include user-provided data as well as transaction history data, user-preferences, user contact information (email/phone number), account settings, reward point balances, or any other customer-related data.

The user 110 optionally also provides one or more identifier(s) 114 used by the POS interface 105 to identify the user 110 and/or the user account. An identifier in the one or more identifier(s) 114 can include, for example, a user email address, a mobile phone number, a user account number, a pin number, or any other identifier. The system 100 utilizes the account data 112 and/or identifier(s) 114 for account identification 116.

A determination is made as to whether the presented physical payment credential 106 is already a card-on-file (CoF) associated with a CoF directory or otherwise digitized or tokenized for utilization in completing payment transactions when the physical payment credential 106 is absent (not physically present).

In some examples, an enrollment inquiry 118 is made via a merchant application programming interface (API) 121 to one or more remote servers and/or back-end services to determine if a tokenized payment credential corresponding to the physical payment credential is already on file. In this non-limiting example, the inquiry is sent to an account identification platform associated with an account server 122. In some examples, the account server 122 is a physical computing device including a processor and memory. In other examples, the account server is implemented as a cloud server.

If a token 120 corresponding to an account reference identifier 124 of the user 110 is present, the payment credential is already digitized. However, if the token 120 is absent indicating the payment credential 106 is not yet enrolled in the digitized payment credential service, a qualification inquiry 126 is made to determine whether the user and/or is qualified to enroll. The qualification determination is made based on a set of user-configurable eligibility rules, as discussed in greater detail in FIG. 7 below.

If the payment credential 106 is not yet digitized and the user is qualified to enroll, an enrollment prompt 128 is displayed to the user in-real time during the current on-going transaction via a user interface (UI) or other display device associated with the POS interface. If the user consents, the system automatically triggers enrollment of the payment credential 106. If enrollment is completed successfully, a notification 103 indicating completion of enrollment is output to the user via the UI.

In one example, the system 100 generates the prompt to nudge the user (shopper) to digitize credentials during a physical payment card transaction. The system captures user consent for digitization of the physically presented credential. The system enables creation, modification and deletion of an identifier used for verification of the user and/or the user profile/account. The system enables creation or enrollment of the user profile/payment account in a secure CoF systems. The system messages and communicates with the user on any completed actions.

In this example, the user 110 is identified based on account data 112 associated with the user 110. However, if the user 110 (cardholder) is previously unknown to the merchant, such that there is no pre-existing user-based account data available to the merchant, the merchant can request account data from the issuer. In this example, if the user (consumer) consents to enrollment, an issuer of the payment credential 106 card 108 provided by the user 110 releases the information to the merchant which is used by the merchant to enroll the user and/or digitize the credential.

In this example, the payment terminal 102 and the POS interface 105 are described as two separate devices or systems which are interlinked such that the payment terminal 102 and the POS interface 105 are capable of exchanging data. In other examples, payment terminal 102 and the POS interface 105 are implemented as a single integrated device or single system.

In this example, the user 110 submits a single payment credential. In other examples, the user (shopper) can provide a second payment credential, a third payment credential or more. In other words, the system can receive multiple differing payment credentials from each shopper and/or a shopper is enabled to submit one or more differing payment credentials during a given transaction.

Figure 2:
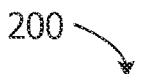
FIG. 2 is an exemplary block diagram illustrating a system for physical credential digitization and enrollment in a digitized payment credential service.

FIG. 2 is an exemplary block diagram illustrating a system 200 for physical credential digitization and enrollment in a digitized payment credential service 202. The POS interface 204 is a device including a customer-facing POS interface system, such as, but not limited to, the POS interface 105. A payment terminal (not shown) for receiving a physical payment credential is communicatively coupled to the POS device, such as, but not limited to, the payment terminal 102 communicatively linked to the POS interface 105 in FIG. 1. In other examples, the POS interface 204 optionally includes a payment terminal integrated within it. In this example, the POS interface 204 receives data associated with a payment credential from a payment terminal including a card reader, such as, but not limited to, the card reader 104 in FIG. 1. The payment credential includes any type of credential, such as, but not limited to, a credit card, debit card, digital wallet associated with a user device, etc.

The POS interface device is a device for completing customer purchase transactions. The POS interface 204 can be implemented as, without limitation, an SCO and/or a payment kiosk. The POS interface 204 is not limited to a self-checkout or unmanned terminal. In other examples, the POS interface 204 can optionally include a payment terminal having a human cashier or other personnel available to assist the customer with completing a transaction to purchase or lease goods and/or services.

The POS interface 204 includes hardware device(s) for reading the data from the payment card 108, such as, but not limited to, a card reader, a scanning device, a near field communications (NFC) device, etc. The POS interface 204 also includes a processor, memory and/or other computing device components for executing computer executable instructions, such as, but not limited to, the payment terminal 102 in FIG. 2.

The POS interface 204 obtains payment account data 112 and/or user-provided data 206 from a user, including, but not limited to, one or more identifier(s) 208. An identifier can include a username, email address, phone number, customer account number (rewards account/loyalty shopper account).

An enrollment manager 212 is a software component implemented on an enrollment server 210. The enrollment server 210 is a computing device, such as, but not limited to, the payment terminal 102 in FIG. 1. The enrollment manager 212 interacts with the user at the POS interface 204 via a portal 214 page.

In some examples, the enrollment manager 212 makes an enrollment inquiry 216 associated with the payment credential 106. In some examples, the inquiry 216 comprises checking an account server 122 to determine if a digitized payment credential for the payment credential already exists. If the payment credential 106 has already been digitized and enrolled in the digitized payment credential service 202 as a CoF 218 entry 220 in a credential database 222, then the system does not prompt 224 the user to re-enroll or digitize the payment credential 106 again. The credential database 222 may be implemented as a directory, router, data storage, cloud storage or any other type of data storage.

The prompt 224 is presented to the user via a UI on the POS interface 204 in real-time as the user is completing a current transaction using the payment credential. The user can accept or decline the request for consent to digitize the payment credential via the UI or other input device.

If a consent is received from the user in response to the prompt 224, an enrollment request to enroll the payment credential in the credential database 222 is transmitted to the digitized payment credential service 202 is triggered or otherwise sent. The digitized payment credential service 202 is any service storing digitized payment credentials, such as, but not limited to, a click-to-pay directory service.

The enrollment manager performs tokenization 226 of the payment credential 106 is performed to create a token corresponding to the CoF 218 (digitized payment credential) created during enrollment of the payment credential. The payment credential token 228 is stored on a data store accessible by the enrollment manager. In this example, the enrollment manager generates the token. In other examples, the token is generated and stored by the account identification manager associated with the account server 122.

The enrollment manager 212 links all the identifier(s) 208 associated with the user account with the payment credential token 228 and/or the user account. The user account can also be referred to as a user profile account, a user profile, a user-data account, a shopper account, or any other term referring to a profile or account for storing user data associated with an account. The set of identifier(s) 230 in this example are linked directly to the token. In other examples, the set of identifier(s) 230 are linked to an account reference identifier (ID) 232 associated with the payment credential token 228 in a many-to-one association to universally identify the user.

In this manner, the enrollment manager 212 can use any identifier provided by the user in a transaction to identify the appropriate payment credential toke 228 and/or account reference ID 232 used to complete a payment transaction using a digitized payment credential corresponding to a physical payment credential 106 which is not physically present at the POS interface 204 at the time of the transaction processing.

In this example, the enrollment manager 212 performs linking 235 of identifier(s) with the payment credential token 228 and/or the account reference ID 232. In other examples, the account identification platform performs the linking.

In some examples, the account reference ID 232 enables the merchant to connect user profile (loyalty program) with payment information to digitally enable the shopper. The account reference ID used to link the identifiers to the user profile makes the credentials portable across all touchpoints.

In some examples, the account reference ID is implemented as an address string which can be used by the account identification platform to route truncated information from the account reference ID address string to the appropriate back-end systems. In this manner, the account identification platform behaves like a router, routing appropriate truncated portions of the information to the appropriate entities.

For example, the account reference ID can include alphanumeric code to represent a merchant account information data field, category data field, country data field, merchant city data field, postal data field, etc. The string can include digits representing identifiers such as customer name data field, username data field, customer number data field, email address data field, mobile phone number data field, biometric profile ID data field, loyalty account number data field, etc. The biometric profile can include biometrics such as face, palm, voice, etc. The account ID can include digits representing QR codes for mobile applications and/or merchant website. The account reference ID address string can include code representing a barcode associated with a mobile application or merchant website, etc. A hash can be used as a data separator. In this example, the account reference ID is in International Organization for Standardization (ISO) format.

In some examples, the enrollment server applies a set of rules 234 to the payment account data 112 and the user-provided data 206 to determine if the user and/or the payment credential are eligible for digitization. The set of rules 234 are configurable, such that the merchant and/or issuer can modify and update the rules as needed. The rules can specify requirements for enrollment such as, but not limited to, frequency of shopping at the merchant store, address of the customer, transaction amount(s), type of payment credential, etc. For example, the set of rules can optionally include a rule that specifies credit cards are eligible, but debit cards are ineligible for enrollment and digitization.

In this example, the enrollment manager 212 sends the request 236 for enrollment of the payment credential 106 to the digitized payment credential service 202. In other examples, the POS interface 204 can directly transmit the request 236 itself, provided the POS interface 204 is connected to a network accessible to the digitized payment credential service, such as, but not limited to, the Internet. In other examples, the account server 122 transmits the request 236 to the digitized payment credential service in response to a determination the payment credential is unenrolled and eligible for enrollment.

In this example, the set of rules 234 includes configurable rules used to govern eligibility of users and/or payment credentials for enrollment and digitization. In other examples, the set of rules 234 also includes rules governing whether additional prompts can be provided to the user at subsequent transactions after the user has rejected/declined an initial prompt to enroll the payment credential. In these examples, the set of rules can include a threshold number of follow-up/subsequent prompts which can be presented to the user, a threshold wait-time between subsequent re-presentation of an enrollment prompt, or any other rules for providing additional prompts after a user refuses consent at presentation of a prompt at the POS device.

In some examples, the identifiers are used by the system to enable users (customers) to identify themselves and/or enable merchants to identify pre-registered customers. A pre-registered customer is a customer that has an existing loyalty account/user account with the merchant.

Figure 3:
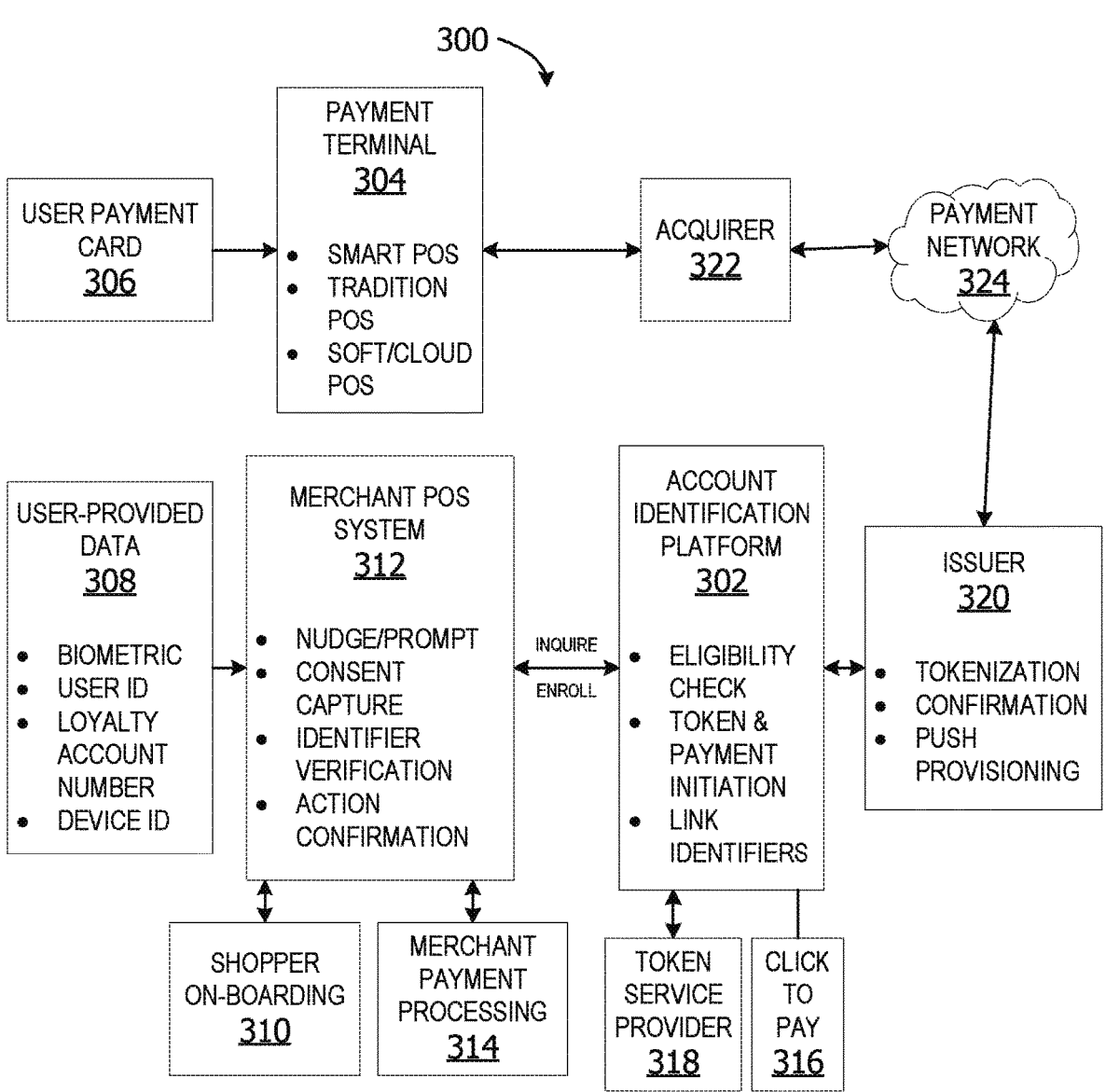
FIG. 3 is an exemplary block diagram illustrating a system including an account identification platform for digitization of credentials via consent at a payment terminal.

FIG. 3 is an exemplary block diagram illustrating a system 300 including an account identification platform 302 for digitization of credentials via consent at a payment terminal 304. The payment terminal 304 is a computing device or payment terminal for processing payment credentials and completing payment transactions, such as, but not limited to, the payment terminal 102 in FIG. 1 and/or the POS interface 204 in FIG. 2.

The payment terminal 304 is a computing device for reading data from a physical payment credential presented by a user, such as, but not limited to, a user payment card 306. The payment card is a physical payment card, such as, but not limited to, the card 108 in FIG. 1.

The payment terminal 304 can include a smart POS, a traditional POS and/or a soft/cloud POS. The payment terminal can include a card reader device, a biometric reader device, a touch screen, an alphanumeric keypad or receiving user-provided data 308 and/or any other input device. The keypad can include a digital keypad as well as a physical keypad having physical keys, buttons, or toggles for entering data. The user-provided data 308 can include biometric data, a user ID, a loyalty account number, a device ID, or any other user-provided data.

The payment terminal 304, in some examples, reads data from the payment card 306 when the payment card is swiped, dipped, tapped, or otherwise scanned by a card reader device associated with the payment terminal 304. The payment terminal may also read data from a digital wallet on a user device via NFC, Bluetooth, scanning a QR code displayed on the mobile user device or any other method of obtaining account data for the payment credential.

The biometric user-provided data can include fingerprint data, palm print data, facial recognition, retinal (eye) scan, etc. The user-provided data is used for shopper on-boarding 310 in a secure and verified manner.

The merchant POS system 312 interacts with the shopper/user by nudging/prompting the user to consent to enrollment, consent capture, identifier verification and/or action confirmation. The POS system creates interaction with shopper during a verified transaction. The POS system optionally also includes generating/updating a user profile, credentials, payment initiation, and/or generating a digital receipt for the user. The merchant payment processing 314 retrieves a credential from the issuer account identification platform 302.

The account identification platform 302 in some examples performs an eligibility check to determine if the user and/or the payment credential is eligible for digitization and enrollment in the click to pay 316 system. The account identification platform 302 optionally also performs token payment initiation and links identifiers to the user payment account reference identifier and/or the payment credential token. In this example, the payment credential token is generated by a token service provider 318 in response to a tokenization request generated by the issuer 320 of the payment card 306. The issuer 320 and an acquirer 322 system associated with the merchant communicate with the merchant POS system via a payment network 324.

The payment network 324 is a network or collection of systems used for transfer of funds through cash substitutes using a variety of protocols and procedures to process the transfer of funds for various transactions. The payment network is used to complete payment transactions between issuer systems, acquirer systems and other systems.

Figure 4:
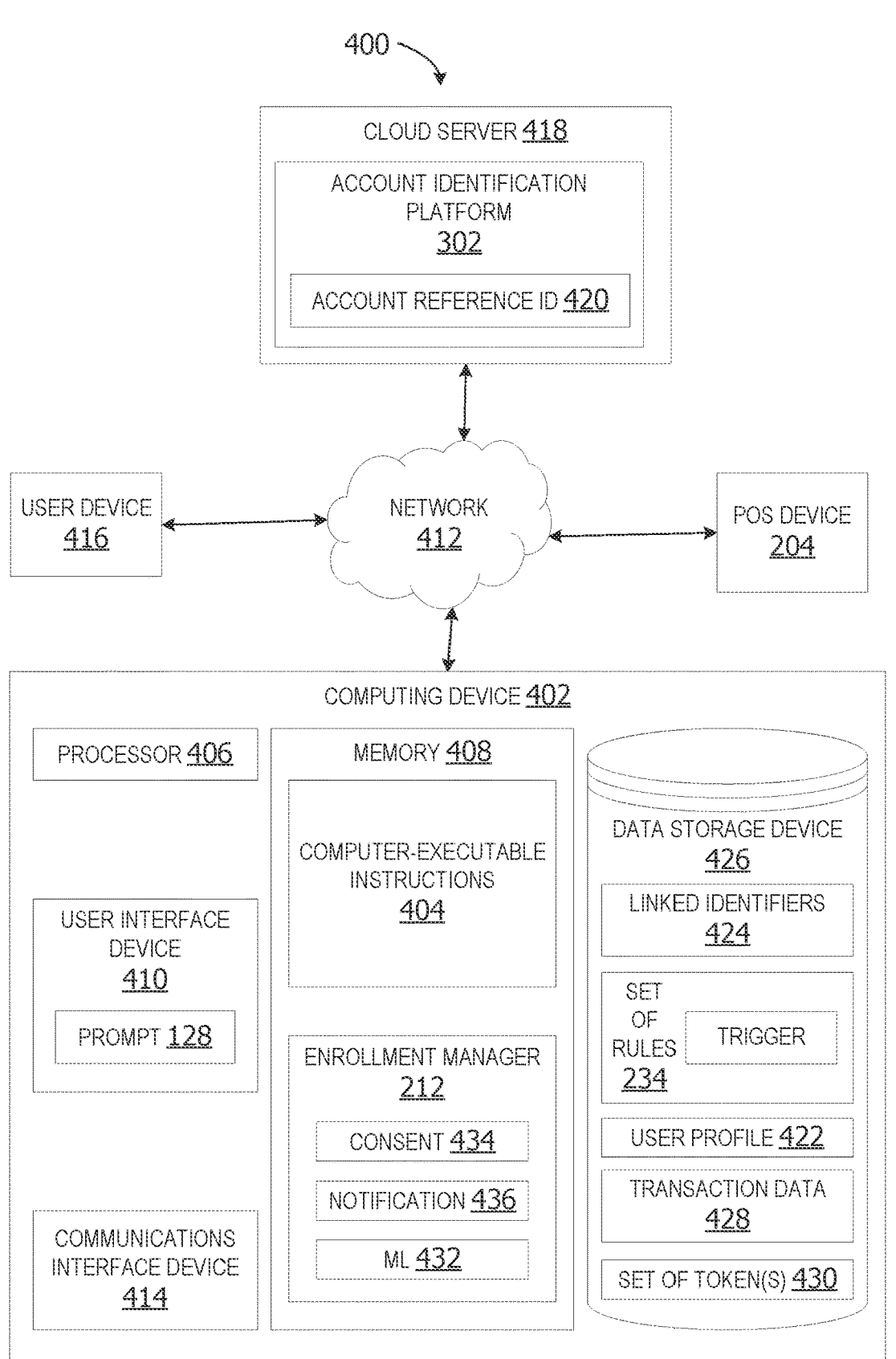
FIG. 4 is an exemplary block diagram illustrating a system for linking a plurality of identifiers to a digitized payment token corresponding to a digitized payment credential.

FIG. 4 is an exemplary block diagram illustrating a system 400 for linking a plurality of identifiers to a digitized payment token corresponding to a digitized payment credential. In the example of FIG. 4, a computing device 402 represents any device executing computer-executable instructions 404 (e.g., as application programs, operating system functionality, or both) to implement the operations and functionality associated with the computing device 402. The computing device 402 in some examples includes a mobile computing device or any other portable device. The computing device 402 can also include less-portable devices such as servers, desktop personal computers, kiosks, or tabletop devices. Additionally, the computing device 402 can represent a group of processing units or other computing devices. In this example, the computing device 402 is a computing device associated with a merchant POS system.

In some examples, the computing device 402 has at least one processor 406 and a memory 408. The computing device 402 in other examples includes a UI device 410. In these examples, the enrollment manager displays the enrollment prompt 128 to the user via the UI device 410.

The processor 406 includes any quantity of processing units and is programmed to execute the computer-executable instructions 404. The computer-executable instructions 404 is performed by the processor 406, performed by multiple processors within the computing device 402 or performed by a processor external to the computing device 402. In some examples, the processor 406 is programmed to execute instructions such as those illustrated in the figures (e.g., FIG. 8, FIG. 9, FIG. 10, and FIG. 11).

The computing device 402 further has one or more computer-readable media such as the memory 408. The memory 408 includes any quantity of media associated with or accessible by the computing device 402. The memory 408 in these examples is internal to the computing device 402 (as shown in FIG. 4). In other examples, the memory 408 is external to the computing device (not shown) or both (not shown).

The memory 408 stores data, such as one or more applications. The applications, when executed by the processor 406, operate to perform functionality on the computing device 402. The applications can communicate with counterpart applications or services such as web services accessible via a network 412. In an example, the applications represent downloaded client-side applications that correspond to server-side services executing in a cloud.

In other examples, the user interface device 410 includes a graphics card for displaying data to the user and receiving data from the user. The user interface device 410 can also include computer-executable instructions (e.g., a driver) for operating the graphics card. Further, the user interface device 410 can include a display (e.g., a touch screen display or natural user interface) and/or computer-executable instructions (e.g., a driver) for operating the display. The user interface device 410 can also include one or more of the following to provide data to the user or receive data from the user: speakers, a sound card, a camera, a microphone, a vibration motor, one or more accelerometers, a BLU-ETOOTH® brand communication module, global positioning system (GPS) hardware, and a photoreceptive light sensor. In a non-limiting example, the user inputs commands or manipulates data by moving the computing device 402 in one or more ways.

The network 412 is implemented by one or more physical network components, such as, but without limitation, routers, switches, network interface cards (NICs), and other network devices. The network 412 is any type of network for enabling communications with remote computing devices, such as, but not limited to, a local area network (LAN), a subnet, a wide area network (WAN), a wireless (Wi-Fi) network, or any other type of network. In this example, the network 412 is a WAN, such as the Internet. However, in other examples, the network 412 is a local or private LAN.

In some examples, the system 400 optionally includes a communications interface device 414. The communications interface device 414 includes a network interface card and/or computer-executable instructions (e.g., a driver) for operating the network interface card. Communication between the computing device 402 and other devices, such as but not limited to a user device 416, a cloud server 418 and/or the POS interface 204, can occur using any protocol or mechanism over any wired or wireless connection. In some examples, the communications interface device 414 is operable with short range communication technologies such as by using near-field communication (NFC) tags.

The user device 416 represents any device executing computer-executable instructions. The user device 416 can be implemented as a mobile computing device, such as, but not limited to, a wearable computing device, a mobile telephone, laptop, tablet, computing pad, netbook, gaming device, and/or any other portable device. The user device 416 includes at least one processor and a memory. The user device 416 can also include a user interface component. In some examples, the user device includes a digital wallet used as a physical payment credential presented at the POS interface 204 during a transaction.

The cloud server 418 is a logical server providing services to the computing device 402 or other clients, such as, but not limited to, the user device 416. The cloud server 418 is hosted and/or delivered via the network 412. In some non-limiting examples, the cloud server 418 is associated with one or more physical servers in one or more data centers. In other examples, the cloud server 418 is associated with a distributed network of servers. In this example, the cloud server 418 hosts the account identification platform 302. The account identification platform 302 generates an account reference ID 420 for the user profile 422. A set of linked identifiers 424 are linked to the digitized payment token via the account reference ID 420.

The system 400 can optionally include a data storage device 1426 for storing data, such as, but not limited to the linked identifiers 424, the set of rules 234, transaction data 428 associated with one or more transactions, and/or a set of token(s) 430 associated with digitized payment credentials.

In other examples, the account reference ID 420 is also stored on the data storage device 426.

The data storage device 426 can include one or more different types of data storage devices, such as, for example, one or more rotating disks drives, one or more solid state drives (SSDs), and/or any other type of data storage device. The data storage device 426 in some non-limiting examples includes a redundant array of independent disks (RAID) array. In other examples, the data storage device 426 includes a database.

The data storage device 426 in this example is included within the computing device 402, attached to the computing device, plugged into the computing device, or otherwise associated with the computing device 402. In other examples, the data storage device 426 includes a remote data storage accessed by the computing device via the network 412, such as a remote data storage device, a data storage in a remote data center, or a cloud storage.

In some examples, the system stores the token as an entry in a database, such as a directory. The token is used to retrieve digitized payment credential(s) stored by a digitized payment credential system, such as a click-to-pay directory service and/or a CoF system.

In some examples, the enrollment manager 212 includes a machine learning (ML) 432 component. The ML 432 may include pattern recognition, modeling, or other machine learning algorithms to analyze sensor data and/or database information to generate alerts, including notifications and/or instructions, temperature trends, item location trends, and/or other patterns in temperature/item location associated with a particular open container.

In some examples, the enrollment manager 212 identifies a user presenting the physical payment credential at the POS interface 204 based on at least one identifier associated with the user. The enrollment manager 212 presents a prompt 128, including, a message requesting consent from the identified user to digitize the physical payment for use in completing future transactions associated with the identified user via the user interface device 410 associated with the POS interface 204. If a consent 434 is received from the user, the enrollment manager 212 creates an enrollment request to enroll the physical payment credential in a digitized payment credential service. A digitized payment credential corresponding to the physical payment card is stored on a credential database by the digitized payment credential service, such as by a router or directory. The enrollment manager 212 generates a payment credential token corresponding to the digitized payment credential for storage within the data storage device 426. The payment credential token is used to complete future transactions associated with the identified user without a presence of the physical payment credential at the POS interface 204. If enrollment is successful, a notification 436 is presented to the user confirming completion of enrollment. If enrollment fails, the notification can include a notice that the payment credential was not successfully enrolled (enrollment failure).

In some examples, the enrollment manager 212 includes a machine learning (ML) 432. The ML 432 component analyzes user consent data and user-feedback to optimize the set of rules 234. For example, the ML 432 can be used to automatically update threshold rules for generating the prompt 128 and/or update the rules for determining if a user is eligible for digitization and/or enrollment.

Figure 5:
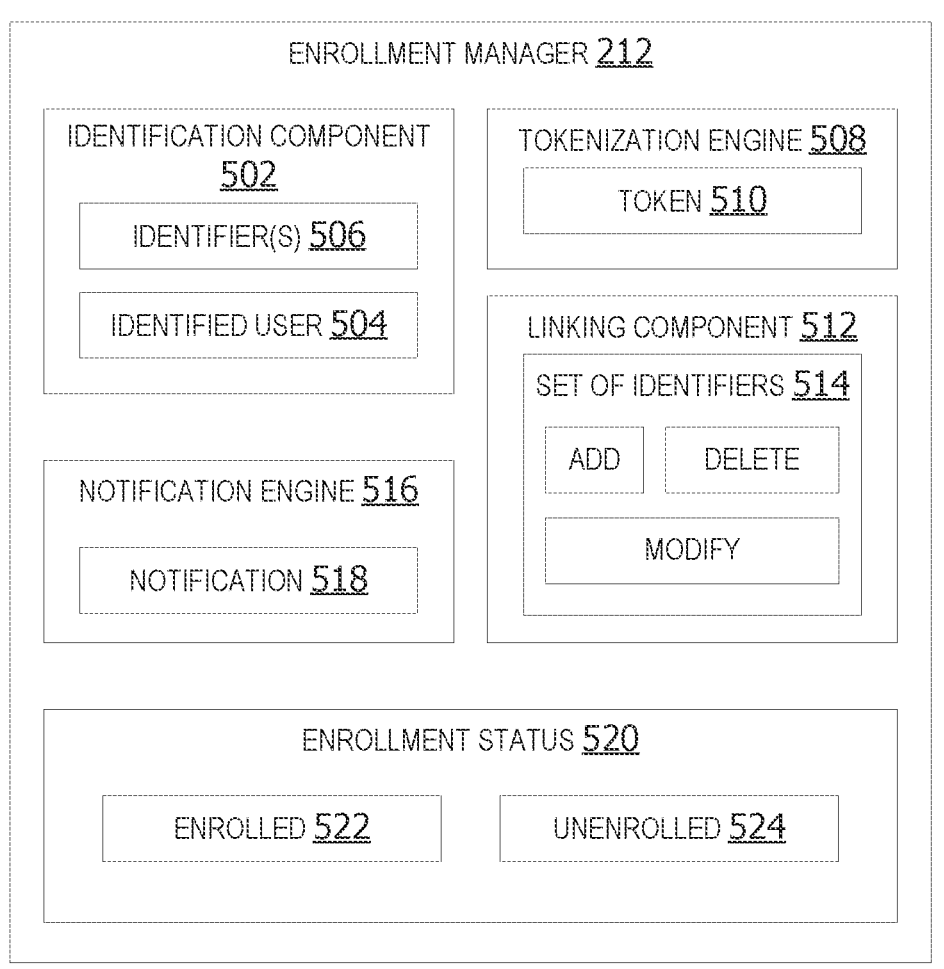
FIG. 5 is an exemplary block diagram illustrating an enrollment manager.

FIG. 5 is an exemplary block diagram illustrating an enrollment manager 212. In some examples, the enrollment manager 212 includes an identification component 502 for identifying a user based on one or more identifier(s) 506.

The identified user 504 is identified based on the identifier(s) and/or data in the user profile. In some examples, the identifier(s) are obtained from a user shopping/rewards account number, email, phone number, biometric data, or other identifier.

A tokenization engine 508 generates a token representing a payment credential. The tokenization engine 508 in this example is part of the enrollment manager. In other examples, the token is requested from a token provisioning system in response to a token request from the enrollment manager.

A linking component 512 links one or more identifiers to the token 510. The linking component 512 optionally updates the identifiers linked to the token. For example, the linking component 512 can add, delete, or modify the identifiers linked to the token.

In other examples, a notification engine 516 generates a notification displayed or otherwise output to the user indicating whether enrollment of the payment credential was successful or failed. The notification in this example is presented to the user via the UI on the POS device/payment terminal. In other examples, the notification is transmitted to the user via an email to the user's email account or text message to the user's mobile user device.

In still other examples, the enrollment manager determines the enrollment status 520 of each new physical credential presented at the POS device. The enrollment status can include an enrolled 522 status or an unenrolled 524 status indicating the physical credential has not been digitized or enrolled in the digitized payment credential system. The digitized payment credential system can be implemented as a click-to-pay directory service or credential on file (CoF) system.

Figure 6:
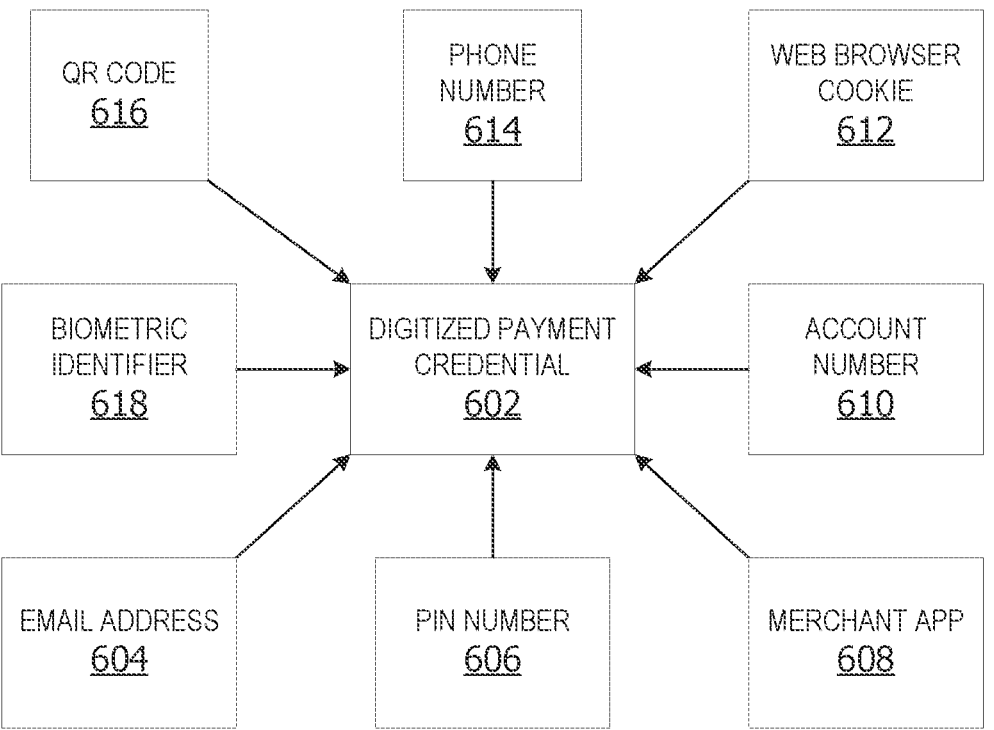
FIG. 6 is an exemplary block diagram illustrating a plurality of linked identifiers associated with a digitized payment credential.

FIG. 6 is an exemplary block diagram illustrating a plurality of linked identifiers 600 associated with a digitized payment credential 602. In this example, the plurality of linked identifiers include an email address 604, PIN number 606, merchant application 608, account number 610, web browser cookie 612 on the user device, phone number 614, QR code 616, and/or biometric identifier 618.

Figure 7:
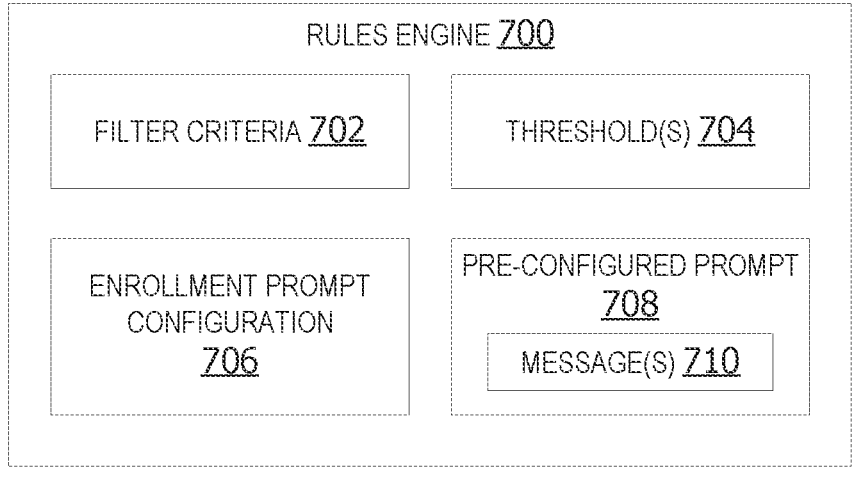
FIG. 7 is an exemplary block diagram illustrating a rules engine including a set of rules for prompting and enrolling a payment credential in a digitized payment credential service.

FIG. 7 is an exemplary block diagram illustrating a rules engine 700 including a set of rules for prompting and enrolling a payment credential in a digitized payment credential service. The set of rules can include filtering criteria 702, such as, but not limited to, bank identification number (BIN) ranges, store location, pre-identified customers, transaction size and/or transaction history of a user. The set of rules can also include one or more threshold(s) 704. The threshold(s) 704 can include a threshold wait-time before sending an additional prompt after a prior prompt to consent to digitization of the payment credential failed to obtain consent from the user. The threshold(s) 704 can include a threshold number of prompts before no additional prompts will be output to the user. The threshold(s) 704 can also include a threshold number of transactions before a user qualifies for payment credential enrollment.

The set of rules can optionally also include an enrollment prompt configuration 706. The prompt configuration can include a prompt frequency, a follow-up procedure after a prompt is rejected. The rules engine 700 can also include pre-configured prompt 708 message(s) 710. A pre-configured prompt message includes the message text included in a prompt displayed to the user at the POS device/payment terminal UI. The message is user-configurable.

In some examples, the merchant can define specific cardholders that will be asked to enroll digitally using filtering criteria. For example, the criteria can define locations where the capability is enabled, target pre-identified customers, set a minimum transaction threshold before prompting a user to enroll and/or select customer profiles based on previous transaction history. In an example scenario, the filtering criteria in the rules may prevent prompting customers located out-of-state or customers that have only engaged in a few transactions with the merchant over an extended period of time, indicating the customer is not likely to be a repeat customer.

In other examples, filtering criteria can be used to set the frequency of enrollment prompts. For example, a merchant/user can configure the set of rules to enable prompts for every second transaction. In another example, the rules can be set to prevent prompts after a threshold number of transactions without obtaining customer consent. In another example, the rules can be set such that if a user opts-out during a transaction, the system will prompt the user again at the very next transaction by that user using the same physical payment credential.

In other examples, the merchant can review account information across multiple accounts via account reference identifiers. For example, the merchant can review all types of identifiers associated with each account. In this manner the merchant and/or customer can be connected to all relevant information sources, such as, credentials, loyalty offers, order history, transaction data and/or customer preferences.

Figure 8:
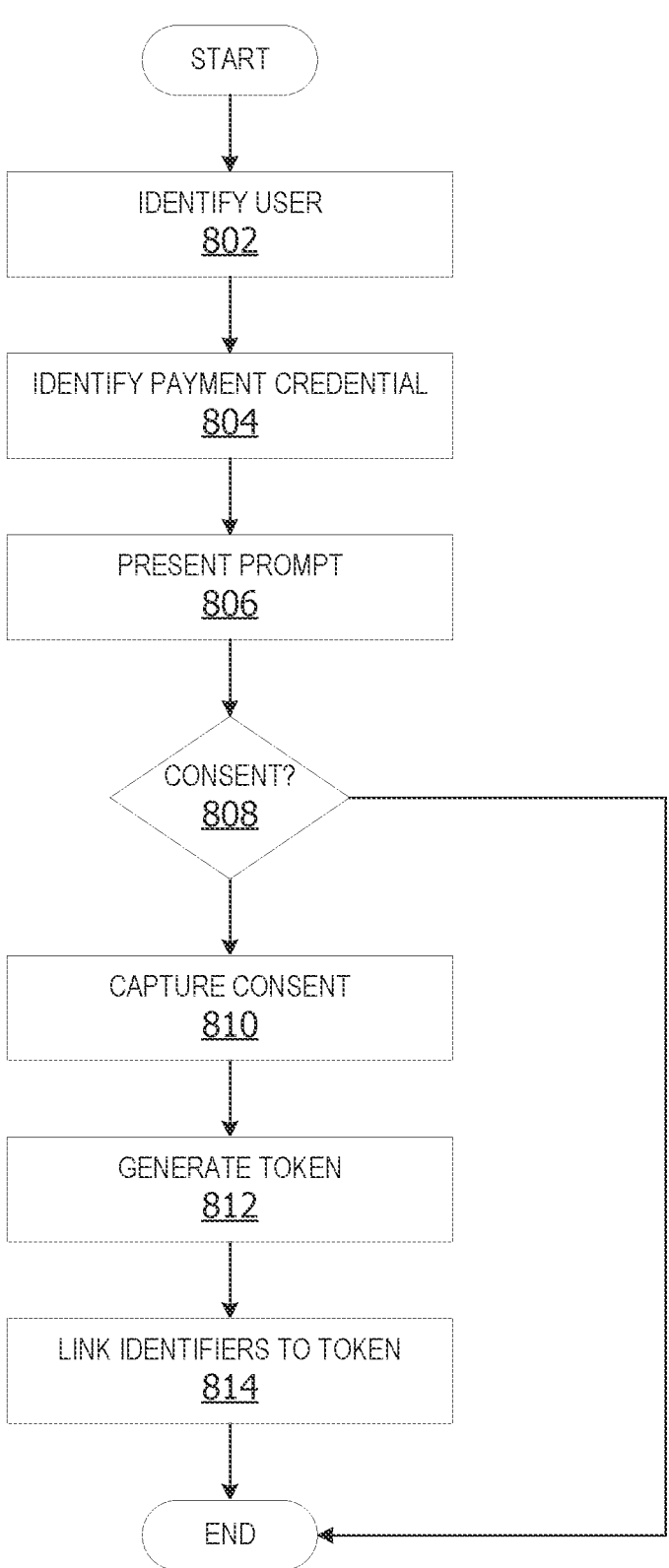
FIG. 8 is an exemplary flow chart illustrating operation of the computing device to tokenize a physical payment credential based on consent obtained at a payment terminal.

FIG. 8 is an exemplary flow chart illustrating operation of the computing device to tokenize a physical payment credential based on consent obtained at a payment terminal. The process is implemented by an enrollment manager executing on a computing device, such as, but not limited to, the payment terminal 102 in FIG. 1, the enrollment server 210 in FIG. 3, and/or the computing device 402 in FIG. 4.

The process begins by identifying a user at 802. The user can be identified based on a user identifier, such as, but not limited to, an email, phone number, account number, etc. A payment credential is identified at 804. The payment credential is identified based on payment account data obtained from the payment credential. A prompt is presented to the user via a UI at 806. A determination is made whether consent is received at 808. If yes, consent is captured at 810. Consent may be captured by saving the consent in a data storage device, on a cloud storage, on a database, or other data store. A token is generated at 812. In some examples, the token is obtained via a token request rather than by generating the token at the enrollment manager. One or more identifiers are linked to the token at 814. The process terminates thereafter.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

Figure 9:
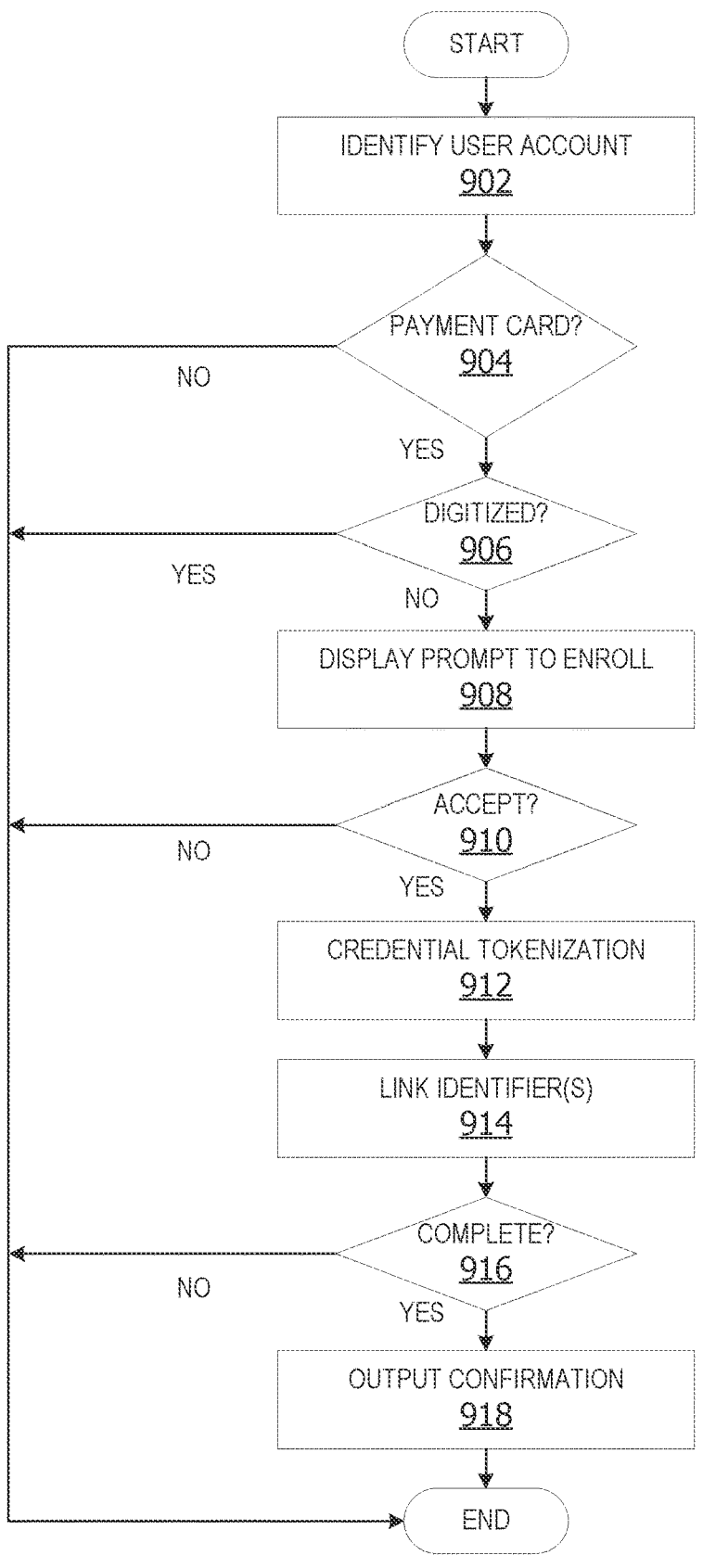
FIG. 9 is an exemplary flow chart illustrating operation of the computing device to digitize and enroll payment credentials via a payment terminal.

FIG. 9 is an exemplary flow chart illustrating operation of the computing device to digitize and enroll payment credentials via a payment terminal. The process is implemented by an enrollment manager executing on a computing device, such as, but not limited to, the payment terminal 102 in FIG. 1, the enrollment server 210 in FIG. 3, and/or the computing device 402 in FIG. 4.

The process begins by identifying a user account associated with a user at 902. The user account can be identified based on an identifier provided by the user, such as by a user scanning a rewards account card or entering an account number, phone number, email address or other identifier. A determination is made whether the payment credential is a payment card or other payment credential at 904. If the user provides cash to complete the transaction, the process terminates thereafter.

If a payment card or other physical payment credential is provided, a determination is made whether the payment card or credential is digitized at 906. If the card is already digitized, the process terminates thereafter.

If the payment card is not digitized at 906, the enrollment manager displays an enrollment prompt at 908. The prompt is displayed at a UI on the payment terminal/POS device. A determination is made whether the user accepts (consent) at 910. If yes, the payment credential is tokenized at 912. One or more identifiers are linked to the token at 914. A determination is made whether the enrollment is complete at 916. If yes, a confirmation notification is output to the user at 918. In this example, the confirmation is displayed via the UI on the payment terminal/POS device. The process terminates thereafter.

While the operations illustrated in FIG. 9 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 9.

Figure 10:
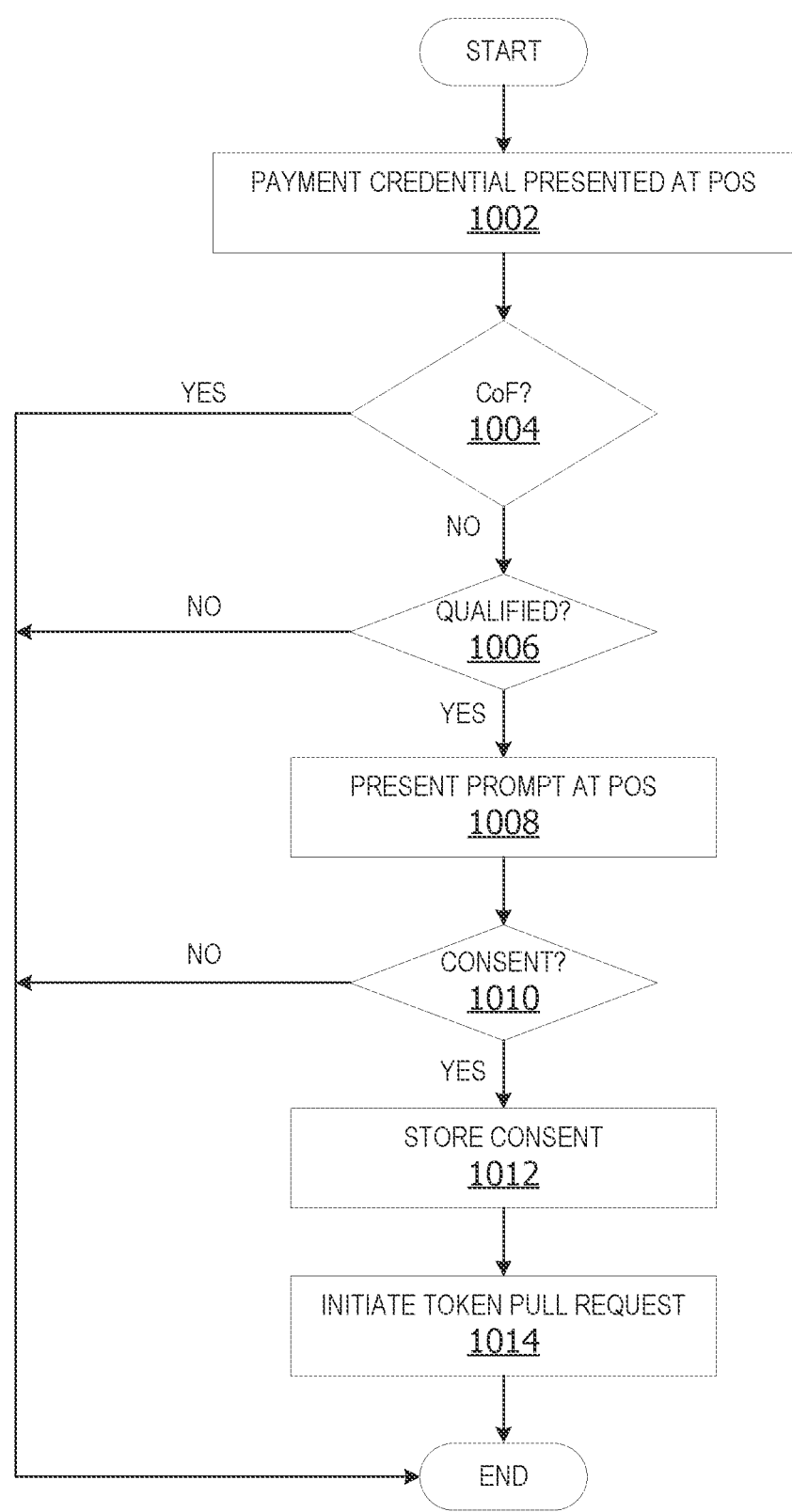
FIG. 10 is an exemplary flow chart illustrating operation of the computing device to determine whether to output a prompt to enroll a payment credential based on a set of rules.

FIG. 10 is an exemplary flow chart illustrating operation of the computing device to determine whether to output a prompt to enroll a payment credential based on a set of rules. The process is implemented by an enrollment manager executing on a computing device, such as, but not limited to, the payment terminal 102 in FIG. 1, the enrollment server 210 in FIG. 3, and/or the computing device 402 in FIG. 4.

The process begins when a payment credential is presented at the payment terminal/POS device at 1002. A determination is made whether the payment credential is already digitized in a CoF at 1004. If no, a determination is made whether the user and/or payment credential is eligible for enrollment at 1006. The determination is made based on a set of eligibility rules. If the user and the payment credential are eligible at 1006, the prompt is presented at the POS at 1008. In this example, the prompt is displayed on a UI of the payment terminal/POS device. A determination is made whether user consent is received at 1010. If yes, the consent is stored in a data store at 1012. A token pull request is initiated at 1014. The token pull request is a request sent by the enrollment manager requesting a payment credential token for the payment credential being enrolled in the digital payment credential system. The process terminates thereafter.

While the operations illustrated in FIG. 10 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 10.

Figure 11:
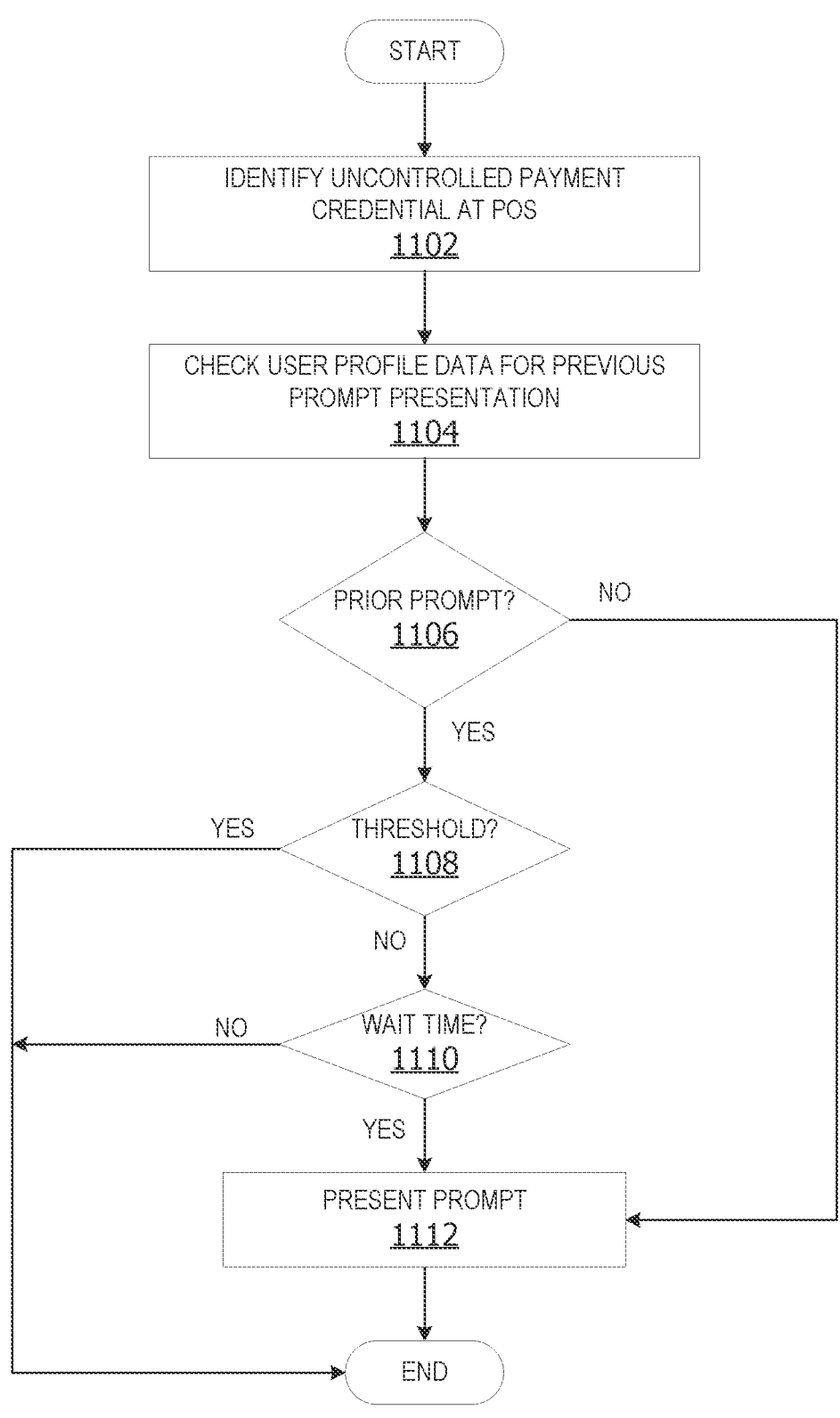
FIG. 11 is an exemplary flow chart illustrating operation of the computing device to provide another prompt to a user that has already rejected a prompt during a previous transaction.

FIG. 11 is an exemplary flow chart illustrating operation of the computing device to provide another prompt to a user that has already rejected a prompt during a previous transaction. The process is implemented by an enrollment manager executing on a computing device, such as, but not limited to, the payment terminal 102 in FIG. 1, the enrollment server 210 in FIG. 3, and/or the computing device 402 in FIG. 4.

The process begins by identifying unenrolled payment credential at the POS at 1102. User profile data is checked for previous prompt presentation to this user for this payment credential at 1104. If a prior prompt was sent at 1106, the enrollment manager determines if the number of prompts previously sent exceeds a threshold number at 1108. If no, a determination is made whether a time passed since the last prompt was presented to the user is greater than a minimum threshold wait-time at 1110. If yes, the prompt is presented to the user at 1112. The process terminates thereafter. In this manner, the system ensures a user is not overwhelmed by unwanted prompts that are being presented too frequently to a user that is not ready to digitize the payment credential.

While the operations illustrated in FIG. 11 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 11.

Figure 12:
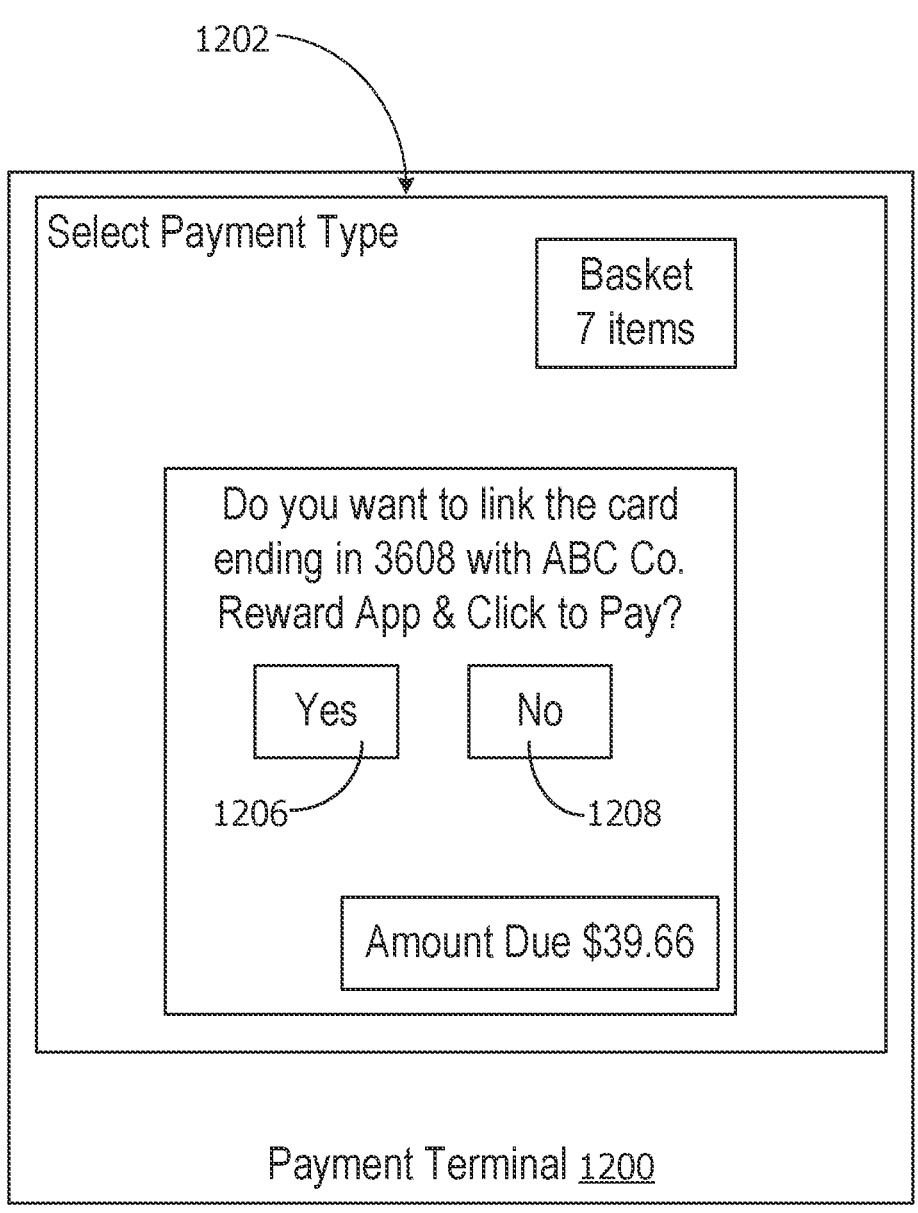
FIG. 12 is an exemplary block diagram illustrating a user interface of a payment terminal displaying a prompt to a user.

FIG. 12 is an exemplary block diagram illustrating a user interface 1202 of a payment terminal 1200 displaying a prompt 1204 to a user. The prompt includes a request for the user to indicate consent (acceptance) or rejection of an offer to enroll the physical payment card presented by the user into the click-to-pay directory service (digitized payment credential system).

Exemplary Operating Environment

Figure 13:
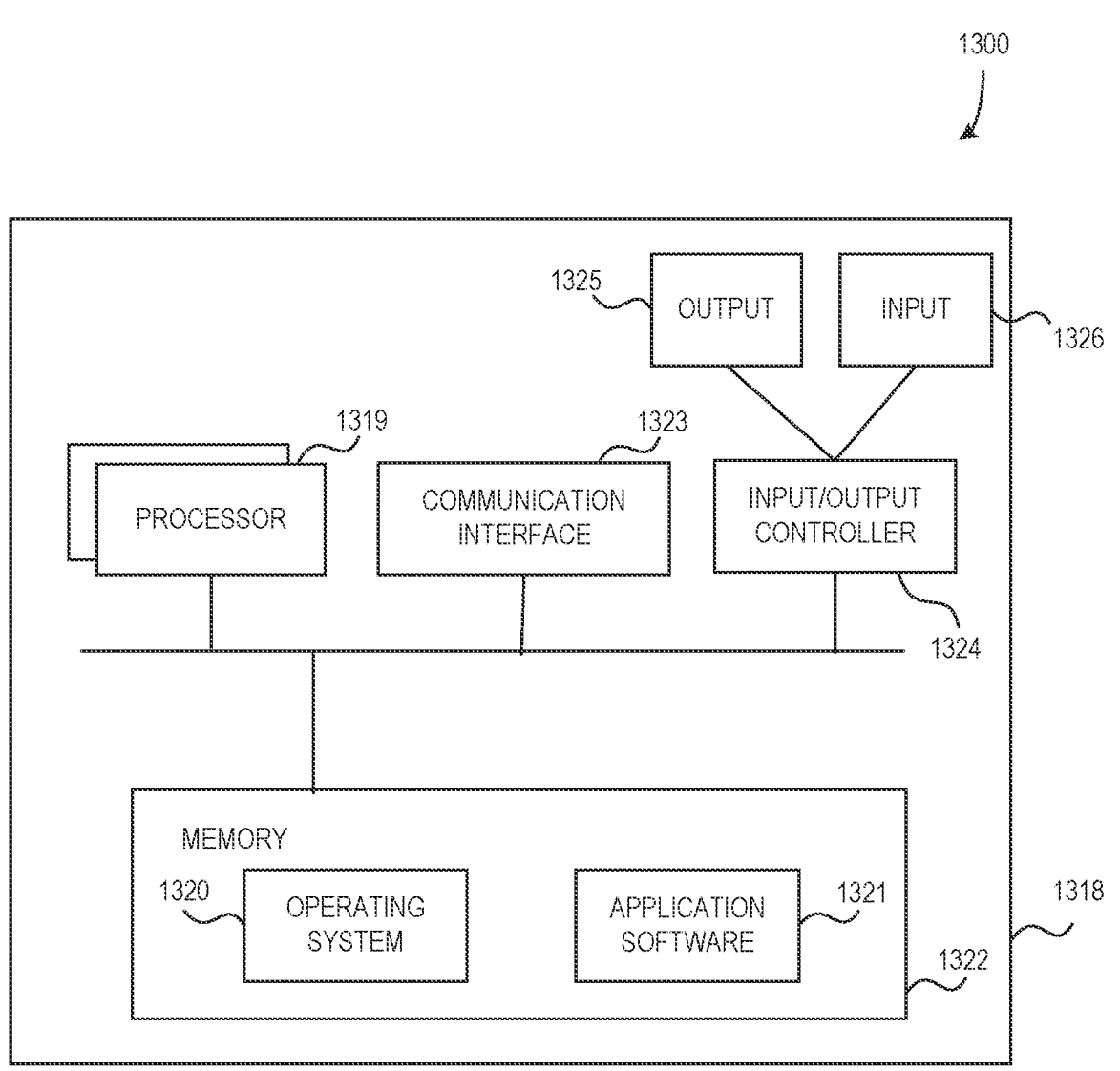
FIG. 13 illustrates a computing apparatus according to an embodiment as a functional block diagram.

The present disclosure is operable with a computing apparatus according to an embodiment as a functional block diagram of a computing apparatus 1300 in FIG. 13. In an embodiment, components of a computing apparatus 1300 may be implemented as a part of an electronic device according to one or more embodiments described in this specification. The computing apparatus 1300 comprises one or more processors 1319 which may be microprocessors, controllers, or any other suitable type of processors for processing computer executable instructions to control the operation of the electronic device. Alternatively, or in addition, the processor 1319 is any technology capable of executing logic or instructions, such as a hardcoded machine. Platform software comprising an operating system 1320 or any other suitable platform software may be provided on the apparatus 1300 to enable application software 1321 to be executed on the device.

Computer executable instructions may be provided using any computer-readable media that are accessible by the computing apparatus 1300. Computer-readable media may include, for example, computer storage media such as a memory 1322 and communications media. Computer storage media, such as a memory 1322, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus.

In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1322) is shown within the computing apparatus 1300, it will be appreciated by a person skilled in the art, that the storage may be distributed or located remotely and accessed via a network or other communication link (e.g., using a communication interface 1323).

The computing apparatus 1300 may comprise an input/output controller 1324 configured to output information to one or more output devices 1325, for example a display or a speaker, which may be separate from or integral to the electronic device. The input/output controller 1324 may also be configured to receive and process an input from one or more input devices 1326, for example, a keyboard, a microphone, or a touchpad. In one embodiment, the output device 1325 may also act as the input device. An example of such a device may be a touch sensitive display. The input/output controller 1324 may also output data to devices other than the output device, e.g., a locally connected printing device. In some embodiments, a user may provide input to the input device(s) 1326 and/or receive output from the output device (s) 1325.

The functionality described herein can be performed, at least in part, by one or more hardware logic components. According to an embodiment, the computing apparatus 1300 is configured by the program code when executed by the processor 1319 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: identify a user presenting a physical payment credential at the POS device based on at least one identifier associated with the user; present a prompt, including, a message requesting consent from the identified user to digitize the physical payment for use in completing future transactions associated with the identified user via a user interface device associated with the POS device; create an enrollment request to enroll the physical payment credential in a digitized payment credential service; and generate a payment credential token corresponding to the digitized payment credential for storage within a data storage device associated with the POS device.

One or more exemplary non-transitory computer readable storage media comprise computer-executable instructions for a smart collect manager that, upon execution by a processor, cause the processor to at least: identify a user presenting a physical payment credential at the POS device based on at least one identifier associated with the user; checking an enrollment status of the physical payment credential in a digitized payment service; present a prompt, including, a message requesting consent from the identified user to digitize the physical payment credential via a user interface device associated with the POS device in response to the enrollment status indicating the physical payment credential is unenrolled; create an enrollment request to enroll the physical payment credential in a digitized payment credential service in response to receiving consent; generate a payment credential token associated with a digital payment credential for storage within a data storage device associated with the POS device; and present an enrollment notification confirming enrollment of the physical payment credential in response to completion of the enrollment.

In an exemplary scenario, a customer presents a physical payment card at a payment terminal (POS device). The payment terminal prompts the shopper to consent to enrollment of the payment credential card into the click-to-pay directory service (digitized payment credential system). If the user consents, the physical credential is digitized and linked to identifiers associated with the customer profile. The identifiers can include biometrics and existing loyalty programs.

In other examples, the merchant system interacts with the client via a merchant portal/dashboard. An enrollment manager applies a set of rules to filter users and/or payment credentials based on user profile data, including historical transaction data. The merchant system drives innovations and moves in-store payment to in-store remote (online) and CoF payments driven by customer journey innovations. The system leverages advanced data and analytics to drive growth, lower costs and increase user acceptance/adoption of digitization for overall efficiency.

Alternatively, or in addition to the other examples described herein, examples include any combination of the following:

receive a second or more additional physical payment credential or additional other physical payment credentials;

check a set of tokens within a data storage device for a pre-generated payment credential token corresponding to the second physical payment credential;

wherein an absence of the pre-generated payment credential token indicates the second physical payment credential is currently unenrolled in the digitized payment credential service;

wherein the prompt is generated in response to a determination a pre-generated payment credential token is absent;

wherein the prompt is cancelled if the pre-generated payment credential token is present indicating the second physical payment credential is already enrolled in the digitized payment credential service;

provide a confirmation notification to the user indicating successful enrollment of the physical payment credential to the identified user via the user interface device;

generate an account reference identifier associated with the identified user within a user profile in response to successful enrollment of the user into the digitized payment credential service;

link the plurality of identifiers to the account reference identifier in a many-to-one association;

wherein provision of at least one identifier in the plurality of identifiers by the identified user is sufficient to retrieve the payment credential token for completion of a payment transaction at the POS device without the presence of the physical payment credential at the POS device;

identify an unenrolled physical payment credential associated with the identified user;

retrieve historical prompt data associated with the unenrolled physical payment credential from a user profile associated with the user; and output the prompt to the user requesting the user consent to enroll in the digitized payment credential service if a number of previous prompts provided to the user is less than a threshold number of prompts;

wherein the prompt remains unissued if the number of previous prompts is greater than or equal to the threshold number of prompts;

analyze user-account data using a set of eligibility rules, the user-account data comprising user-provided data and merchant-provided data associated with the identified user;

providing the prompt requesting user consent to enrollment in the digitized payment credential service if the user is eligible for enrollment based on the set of eligibility rules;

detect a new identifier associated with the identified user;

update the set of identifiers liked to the digital payment token, wherein the updated set of identifiers includes the new identifier;

identifying a physical payment credential presented by a user at a POS device;

presenting a prompt, including, a message requesting consent from the user to digitize the physical payment for use in completing future transactions associated with the identified user, to the identified user via a user interface device associated with the POS device;

capturing a consent from the user via the user interface device, wherein enrollment of the physical payment credential in a digitized payment credential service is triggered by consent, and wherein the physical payment credential remains unenrolled in an absence of captured consent;

generating a payment credential token corresponding to a digitized payment credential, wherein the digitized payment credential is a tokenized physical payment credential on the digitized payment credential service;

linking the payment credential token to a set of identifiers associated with the user;

wherein the user presentation of an identifier in the set of identifiers at the POS device is used in future transactions to identify the user and retrieve the payment credential token;

receiving a new physical payment credential associated with the user;

checking a set of tokens within a data storage device for a pre-generated payment credential token corresponding to the new physical payment credential;

wherein an absence of the pre-generated payment credential token indicates the new physical payment credential is currently unenrolled in the digitized payment credential service;

wherein the prompt is generated in response to a determination a pre-generated payment credential token is absent;

wherein the prompt is cancelled in response to an identification of the pre-generated payment credential token indicating the new physical payment credential is already enrolled in the digitized payment credential service;

notifying the user of successful enrollment of the physical payment credential via a notification presented to the user via the user interface device;

generating an account reference identifier associated with the identified user within a user profile in response to successful enrollment of the user into the digitized payment credential service for linking a plurality of identifiers to the payment credential token in a many-to-one association;

linking a plurality of identifiers associated with the user to the account reference identifier;

wherein provision of at least one identifier in the plurality of identifiers is sufficient to retrieve the payment credential token for completion of a payment transaction at the POS device without the presence of the physical payment credential at the POS device;

identifying an unenrolled physical payment credential associated with the user;

retrieving historical prompt data associated with the unenrolled physical payment credential from a user profile associated with the user;

outputting the prompt to the user requesting the user consent to enroll in the digitized payment credential service if a number of previous prompts provided to the user is less than a threshold number of prompts, wherein the prompt remains unissued if the number of previous prompts is greater than or equal to the threshold number of prompts;

outputting the prompt to the user requesting the user consent to enroll in the digitized payment credential service if a time-period since a last prompt exceeds a threshold minimum time-period, wherein the prompt remains unissued if the time-period elapsed since the last prompt is less than the threshold minimum time-period;

analyzing user-consent data for a plurality of users accepting at least one prompt to enroll at least one payment credential in the digitized payment credential service;

identifying, by a machine learning component, a number of prompts and wait-time between issued prompts for user acceptance;

updating, automatically, at least one threshold for presenting a prompt to at least one user based on at least one of the identified number of prompts and the wait-time;

analyzing user-account data using a set of eligibility rules, the user-account data comprising user-provided data and merchant-provided data associated with the identified user;

providing the prompt requesting user consent to enrollment in the digitized payment credential service if the user is eligible for enrollment based on the set of eligibility rules;

detecting a new identifier associated with the identified user;

updating the set of identifiers liked to the digital payment token, wherein the updated set of identifiers includes the new identifier;

identify a user presenting a physical payment credential at the POS device based on at least one identifier associated with the user;

checking an enrollment status of the physical payment credential in a digitized payment service;

present a prompt, including, a message requesting consent from the identified user to digitize the physical payment credential via a user interface device associated with the POS device in response to the enrollment status indicating the physical payment credential is unenrolled;

create an enrollment request to enroll the physical payment credential in a digitized payment credential service in response to receiving consent;

generate a payment credential token associated with a digital payment credential for storage within a data storage device associated with the POS device;

wherein the payment credential token corresponds to the physical payment credential stored by the digitized payment credential service, wherein the payment credential token is used to complete future transactions associated with the identified user without a presence of the physical payment credential at the POS device;

present an enrollment notification confirming enrollment of the physical payment credential in response to completion of the enrollment;

generate an account reference identifier associated with the identified user within a user profile in response to successful enrollment of the user into the digitized payment credential service;

link the plurality of identifiers to the account reference identifier in a many-to-one association, wherein provision of at least one identifier in the plurality of identifiers by the identified user is sufficient to retrieve the payment credential token for completion of a payment transaction at the POS device without the presence of the physical payment credential at the POS device; and output the prompt to the user requesting the user consent to enroll in the digitized payment credential service if a number of previous prompts provided to the user is less than a threshold maximum number of prompts and a time-period since a previous prompt is greater than a minimum threshold wait-time.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It is understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for identifying a physical payment credential presented by a user at a POS device; exemplary means for presenting a prompt, including, a message requesting consent from the user to digitize the physical payment for use in completing future transactions associated with the identified user, to the identified user via a user interface device associated with the POS device; exemplary means for capturing a consent from the user via the user interface device; exemplary means for generating a payment credential token corresponding to a digitized payment credential; and exemplary means for linking the payment credential token to a set of identifiers associated with the user.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for reducing system resource usage through credential digitization via a point-of-sale (POS) device, the system comprising:

at least one processor; and at least one computer readable medium storing computer-executable instructions, which, when executed by the at least one processor, cause the at least one processor to:

receive a physical payment credential, presented by a user, at a first POS device associated with a merchant computing system;

check the physical payment credential against pre-existing user account data available at the merchant computing system to identify the user;

update a set of rules based on an analysis of user consent data and user feedback data obtained from a database;

determine that the physical payment credential is not digitized in a credential-on-file (CoF) system;

determine that the user is eligible for enrollment in a CoF system in accordance with the updated set of rules;

based on determining the physical payment credential is not digitized and the user is eligible for enrollment, automatically present a prompt to the user, in accordance with the set of rules via a user interface, at the first POS device, while the user is completing a current transaction, as a text message, requesting a consent from the user to digitize the physical payment credential for use in completing a future transaction associated with the user, and receive the consent at the first POS device;

based on receiving the consent, register the physical payment credential associated with the user in a digitized payment credential service, wherein a digitized payment credential corresponding to the physical payment credential is stored on a credential database associated with the digitized payment credential service;

generate a payment credential token corresponding to the digitized payment credential;

link a set of identifiers of the user to the payment credential token, the set of identifiers including at least the user account data and user biometrics; and store the payment credential token with the set of identifiers in the credential database, the storage enabling use of the payment credential token at any POS device in completing a future transaction associated with the user without presentation of the physical payment credential;

wherein the payment credential token is usable, at a second POS device, to provide access to the user account data and the user biometrics for completing a transaction in response to a request for the transaction at the second POS device, the request presenting an identifier from the set of identifiers without presentation of the physical payment credential, wherein the identifier for the transaction is provided based on a capability of the second POS device, wherein the payment credential token is retrieved from the credential database using the presented identifier.

2. The system of claim 1, wherein the instructions, when executed by the at least one processor, further causes the at least one processor to:

receive a second physical payment credential; and check a set of tokens at the first POS device for a pre-generated payment credential token corresponding to the second physical payment credential, wherein an absence of the pre-generated payment credential token indicates the second physical payment credential is currently unenrolled in the digitized payment credential service, wherein the prompt is generated in response to a determination that the pre-generated payment credential token is absent, and wherein the prompt is cancelled if the pre-generated payment credential token is present indicating the second physical payment credential is already enrolled in the digitized payment credential service.

3. The system of claim 1, wherein the instructions, when executed by the at least one processor, further causes the at least one processor to:

provide a confirmation notification to the user indicating successful enrollment of the physical payment credential to the user via the user interface.

4. The system of claim 1, wherein the first POS device is connected to a network comprising a collection of systems used for transfer of funds through cash substitutes using a protocol and a procedure to process the transfer of funds for the transaction identifying the physical payment credential.

5. The system of claim 1, wherein the instructions, when executed by the at least one processor, further causes the at least one processor to:

identify an unenrolled physical payment credential associated with the user; retrieve historical prompt data associated with the unenrolled physical payment credential from a user profile associated with the user; and output the prompt to the user requesting user consent to enroll in the digitized payment credential service if a number of previous prompts provided to the user is less than a threshold number of prompts, wherein the prompt remains unissued if the number of previous prompts is greater than or equal to the threshold number of prompts.

6. The system of claim 1, wherein a machine learning (ML) component is used to automatically update the set of rules for generating the prompt and update the set of rules for determining that the user is eligible for enrollment in the CoF system.

7. The system of claim 1, wherein the instructions, when executed by the at least one processor, further causes the at least one processor to:

detect a new identifier associated with the user; and update the set of identifiers linked to the payment credential token, wherein the updated set of identifiers includes the new identifier.

8. A computerized method for reducing system resource usage through digitization of credentials at a point-of-sale (POS) device, the method comprising:

receiving a physical payment credential, presented by a user, at a first POS device associated with a merchant computing system;

checking the physical payment credential against preexisting user account data available at the merchant computing system to identify the user;

updating a set of rules based on an analysis of user consent data and user feedback data obtained from a database;

determining that the physical payment credential is not digitized in a credential-on-file (CoF) system;

determining that the user is eligible for enrollment in a CoF system in accordance with the updated set of rules;

based on determining the physical payment credential is not digitized and the user is eligible for enrollment, automatically presenting a prompt to the user, in accordance with the set of rules, via a user interface, at the first POS device, while the user is completing a current transaction, as a text message requesting a consent from the user to digitize the physical payment credential for use in completing a future transaction associated with the user and receiving the consent at the first POS device;

based on receiving the consent, registering the physical payment credential associated with the user in a digitized payment credential service, and wherein a digitized payment credential corresponding to the physical payment credential is stored on a credential database associated with the digitized payment credential service;

generating a payment credential token corresponding to a digitized payment credential, linking a set of identifiers of the user to the payment credential token, the set of identifiers including at least the user account data and user biometrics;

storing the payment credential token with the set of identifiers in the credential database, the storage enabling use of the payment credential token at any POS device in completing a future transaction associated with the user without presentation of the physical payment credential;

subsequently receiving a request for a transaction at a second POS device, the request presenting an identifier from the set of identifiers without presentation of the physical payment credential;

retrieving, from the credential database, the payment credential token using the presented identifier, the payment credential token providing access to the user account data and the user biometrics, without presentation of the physical payment credential; and completing the transaction using the retrieved payment credential token.

9. The computerized method of claim 8, further comprising:

receiving a new physical payment credential associated with the user; and checking a set of tokens at the first POS device for a pre-generated payment credential token corresponding to the new physical payment credential, wherein an absence of the pre-generated payment credential token indicates the new physical payment credential is currently unenrolled in the digitized payment credential service, wherein the prompt is generated in response to a determination that the pre-generated payment credential token is absent, wherein the prompt is cancelled in response to an identification of the pre-generated payment credential token indicating the new physical payment credential is already enrolled in the digitized payment credential service.

10. The computerized method of claim 8, further comprising:

generating a notification indicating successful enrollment of the physical payment credential to the user via the user interface.

11. The computerized method of claim 8, wherein the first POS device is connected to a network comprising a collection of systems used to transfer funds through a cash substitute using a protocol and a procedure to process the transfer of the funds for the transaction identifying the physical payment credential.

12. The computerized method of claim 8, further comprising:

identifying an unenrolled physical payment credential associated with the user; retrieving historical prompt data associated with the unenrolled physical payment credential from a user profile associated with the user; and outputting the prompt to the user requesting user consent to enroll in the digitized payment credential service if a number of previous prompts provided to the user is less than a threshold number of prompts, wherein the prompt remains unissued if the number of previous prompts is greater than or equal to the threshold number of prompts.

13. The computerized method of claim 8, further comprising:

identifying an unenrolled physical payment credential associated with the user;

retrieving historical prompt data associated with the unenrolled physical payment credential from a user profile associated with the user; and outputting the prompt to the user requesting user consent to enroll in the digitized payment credential service if a time-period since a last prompt exceeds a threshold minimum time-period, wherein the prompt remains unissued if the time-period elapsed since the last prompt is less than the threshold minimum time-period.

14. The computerized method of claim 8, further comprising:

analyzing user-consent data for a plurality of users accepting at least one prompt to enroll at least one payment credential in the digitized payment credential service;

identifying, by a machine learning component, a number of prompts and wait-time between issued prompts for user acceptance; and updating, automatically, at least one threshold for presenting a prompt to at least one user based on at least one of the identified number of prompts and the wait-time.

15. The computerized method of claim 8, further comprising:

analyzing user-account data using a set of eligibility rules, the user-account data comprising user-provided data and merchant-provided data associated with the user; and providing the prompt requesting user consent to enrollment in the digitized payment credential service if the user is eligible for enrollment based on the set of eligibility rules.

16. The computerized method of claim 8, further comprising:

detecting a new identifier associated with the user; and
updating the set of identifiers linked to the payment credential token,
wherein the updated set of identifiers includes the new identifier.

17. A computer readable medium storing program instructions for reducing system resource usage through credential digitization, which, when executed by a processor of a computer, cause the computer to:

receive a physical payment credential, presented by a user, at a first POS device associated with a merchant computing system;

check the physical payment credential against pre-existing user account data available at the merchant computing system to identify the user;

update a set of rules based on an analysis of user consent data and user feedback data obtained from a database;

determine that the physical payment credential is not digitized in a credential-on-file (CoF) system;

determine that the user is eligible for enrollment in the CoF system in accordance with the updated set of rules;

based on determining that the physical payment credential is not digitized and the user is eligible for enrollment, automatically present a prompt, to the user, in accordance with the set of rules via a user interface, at the first POS device, while the user is completing a current transaction, as a text message requesting a consent from the user to digitize the physical payment credential into a digitized payment credential for use in completing a future transaction associated with the user, and receive the consent at the first POS device;

based on receiving the consent, register the physical payment credential associated with the user in a digitized payment credential service, wherein a digitized payment credential corresponding to the physical payment credential is stored on a credential database associated with the digitized payment credential service;

generate a payment credential token corresponding to the digitized payment credential;

link a set of identifiers of the user to the payment credential token, the set of identifiers including at least the user account data and user biometrics;

store the payment credential token with the set of identifiers in the credential database, the storage enabling use of the payment credential token at any POS device in completing a future transaction associated with the user without presentation of the physical payment credential;

subsequently receive a request for a transaction at a second POS device, the request presenting an identifier from the set of identifiers without presentation of the physical payment credential;

retrieve, from the credential database, the payment credential token using the presented identifier, the payment credential token providing access to the user account data and the user biometrics, without presentation of the physical payment credential; and complete the transaction using the retrieved payment credential token.

18. The computer readable medium of claim 17, wherein the first POS device is connected to a network comprising a collection of systems used to transfer funds through a cash substitute using a protocol and a procedure to process the transfer of the funds for the transaction identifying the physical payment credential.

19. The computer readable medium of claim 17, wherein the instructions, when executed by a processor of the computer, cause the computer to further perform:

retrieve historical prompt data associated with an unenrolled physical payment credential from a user profile associated with the user; and output the prompt to the user requesting user consent to enroll in the digitized payment credential service if a number of previous prompts provided to the user is less than a threshold maximum number of prompts and a time-period since a previous prompt is greater than a minimum threshold wait-time.

20. The computer readable medium of claim 17, wherein the instructions, when executed by a processor of the computer, cause the computer to further perform:

detect a new identifier associated with the user; and update the set of identifiers linked to the payment credential token, wherein the updated set of identifiers includes the new identifier.

* * * * *